United States Patent Office 3,065,138
Patented Nov. 20, 1962

3,065,138
THERAPEUTIC PREPARATIONS OF ELEMENTAL IRON
Thomas A. Lynch, Columbus, Ohio, assignor to The Warren-Teed Products Company, Columbus, Ohio, a corporation of Ohio
No Drawing. Filed Oct. 9, 1959, Ser. No. 845,338
20 Claims. (Cl. 167—68)

This invention relates to the manufacture of colloidal therapeutic preparations containing iron suitable for use in parenteral injection and of the type called generically "colloidal injectable iron preparations."

Most parenteral preparations used in the treatment of iron-deficiency anemias have limited utility. "Saccharated iron oxide," a colloidal form of ferric hydroxide in combination with a sugar, can be used for the treatment of iron-deficiency anemia when administered intravenously but causes severe local irritation and inflammation and is not absorbed when given by injection into the muscle or subcutaneous tissue. Ferric chloride can be injected by being in an 0.25 percent aqueous solution but is quite toxic and irritating when injected directly into the tissue. Other substances such as ferric gluconate and ferrous sulfate are absorbed from tissue on injection but are highly toxic and can cause death. Certain chelates such as iron ethylenediaminetetraacetic acid are toxic in contact with tissue and, since they react with tissue calcium, they may cause tetany. Iron dextran, a colloidal ferric hydroxide, obtained by heating a suitable water-soluble ferric salt and dextran together in an aqueous solution with an excess of alkali and similarly produced iron dextrin are the only parenteral preparations at this time which are free of the above mentioned disadvantages.

The object of this invention is to perfect an iron solution intended for intramuscular injection which will satisfy the following requirements:

(a) Adjustability of pH to that of the body fluids;
(b) Low toxicity;
(c) No local tissue damage when injected subcutaneously or intramuscularly;
(d) Stores readily in the liver and is gradually released by that store organ;
(e) Stability in presence of protein and electrolytes;
(f) Maximal iron content in minimum volume, up to 5% elemental iron in solution;
(g) Rapid absorption coupled with a low rate of excretion;
(h) Reproducibility;
(i) Stability on storage.

A further object of this invention is to produce an iron complex in a unique magnetic form in combination with derived proteins, characteristic of ferritin, the protein-iron complex found to be the natural storage form of iron in the body.

The principal object of my invention is to provide more particularly for the treatment of iron-deficiency anemia a colloidal iron preparation, which is especially suitable for intramuscular injection (although adaptable also for intravenous injection and oral administration) and is well tolerated without the onset of undesirable local or general side effects.

A further object is to obtain an iron containing preparation, essentially free from iron ions, which can be administered in dosage adequate for producing the required therapeutic response and from which the iron is absorbed rapidly into the circulation with absence of untoward systemic reactions, e.g., vasodilation, headache, lumbar pain, vomiting and loss of consciousness.

With the foregoing objects in view, the present invention provides therapeutically effective iron preparations consisting essentially of colloidal substantially non-ionic gelatin iron and polyvinylpyrrolidone-iron complexes, believed to be novel in themselves. Colloidal iron preparations may be produced according to the invention by reacting, with such heating as may be necessary, a solution of gelatin or of polyvinylpyrrolidone with finely-divided iron, to form a colloidal solution from which any undissolved matter may be separated and which has a pH of between 5.0 and 6.0. If necessary, the pH of the preparation may be adjusted between 2.0 and 12.0. Within this range the preparations appear to be capable of retaining its stability in water for reasonable periods of time. However, the pH of the preparation for injection may be adjusted to between 5.5 and 8.5, preferably 6.5. The molecular structure of the product is not yet known with certainty and it can, therefore, be defined only in empirical terms by analysis. Both the gelatin-iron and polyvinylpyrrolidone iron complexes are water soluble, insoluble in ethylalcohol, and a clear, dark reddish-brown color in aqueous solution. Analysis reveals that the percentage of iron found in the product varies with the conditions of preparation. This would indicate that the composition of each resultant iron complex is different, varying with the conditions of preparation. The solid PVP-iron and gelatin-iron were found to have magnetic properties as indicated by their sensitivity in a magnetic field.

No claim is made as to the efficacy and safeness of the new complexes for administration to humans and it is advised that such procedure should not be undertaken without adequate preliminary studies to insure efficacy and non-toxicity in humans.

The finely-divided iron preferred by us is reduced iron obtained from Mallinckrodt Chemical Co., New York, prepared by reducing ferric oxide with hydrogen at a dull red heat. It is of N.F. grade, containing not less than 90% Fe, atomic weight 55.85. The material, an odorless grayish black powder, is stable in air and passes through a number 100 sieve.

The gelatin preferred by us is U.S.P. grade, edible No. 605 obtained from the American Agricultural Chemical Co., Detroit, Michigan. It is obtained by partial hydrolysis of collagen derived from the skin, white connective tissue and bones of animals. The above edible gelatin, derived from an acid-treated precursor, exhibits an iso-electric point between pH 7 and pH 9 and is known as type A.

The polyvinylpyrrolidone preferred by us is prepared by the Antara Chemicals Division of General Aniline & Film Corporation, New York, New York, and is known commercially as Plasdone C. This preparation has the following specifications:

| | |
|---|---|
| Relative viscosity | Fikentscher K–30±2. |
| Viscosity distribution | Not more than 15% PVP has a viscosity greater than K–41. |
| | Not more than 25% PVP has a viscosity lower than K–16. |
| Moisture content | Less than 5%. |
| Unsaturation (calculated as monomer) | Less than 1%. |
| Ash | Less than 0.2%. |
| Heavy metals content | Less than 20 p.p.m. |
| Arsenic content | Less than 2 p.p.pm. |
| Nitrogen content | 12.6% 0.4%. |
| Acetaldehyde content | Less than 0.5%. |

PVP is a white powder which dissolves readily in water. The polymer is also soluble in many organic solvents but is substantially insoluble in ether at room temperature. PVP as a powder or an aqueous solution is stable to heat. PVP has a molecular weight range of about 20,000 to 80,000 (average 40,000), corresponding to a chain of 192 to 720 monomer units. In its capacity for binding water and absorbing physiological and non-physiological products, PVP shows a resemblance to the proteins of natural blood plasma. It is found to be slightly acid having a pH of 4.

PRELIMINARY INVESTIGATIONS

Investigations were made pursuant to obtaining gelatin-iron and PVP-iron complexes with the highest possible content of iron. This was pursued by varying the conditions of reaction of the process. The reactants were alternately steam heated, oven heated and autoclaved. The ratio of reduced iron to gelatin (or PVP) to water concentration on the resultant product. Examples of these investigations are shown in Table I below:

TABLE I

*Process and Methods Used in the Synthesis of Gelatin-Iron and PVP-Iron Complexes*

| Run* | Reduced iron gm. | Material, distilled water, ml. | Gelatin, gm. | Steam bathing | Treatment oven 60° C. | Autoclave 20 lbs./sq. in. | Analysis, percent of elemental iron (Fe) |
|---|---|---|---|---|---|---|---|
| FG-1 | (¹) | | | | | | |
| FG-2 | 5 | 100 | 10 | 2 hrs | | ½ hr | 0.753 (in 24 ml.). |
| FG-3 | (¹) | | | | | | |
| FG-4 | 50 | 500 | 15 | 1½ hrs | | ½ hr | 0.853 (in 40 ml.). |
| FG-5 | 75 | 500 | 30 | 1½ hrs | | ½ hr | 0.732 (in 45 ml.). |
| FG-6 | 25 | 500 | 30 | 1½ hrs | | ½ hr | 0.741 (in 42 ml.). |
| FG-7 | 100 | 900 | 15 | 2½ hrs | 10 hrs | ½ hr | 1.64 (in 23 ml.). |
| FG-8 | 25 | 30 | 50 | | 8 hrs | ½ hr | 4.92 (dry weight). |
| FG-9 | 25 | 1,000 | 50 | ½ hr | 18 hrs | 5½ hr | 1.22 (dry weight). |
| FG-10₁ | 25 | 50 | 100 | 1½ days | | | 2.61 (dry weight). |
| FG-10₂ | Concentrated to a semi-solid mass over steam bath, diluted with 200 ml. of distilled water, reconcentrated to a thick mass after 3 hours on a steam bath using an air stream, 25 gm. more of reduced iron added and autoclaved for 20 minutes | | | | | | 8.60 (dry weight). |
| FG-10₃ | FG-10₂ was evaporated to dryness on steam bath, 25 gm. of reduced iron added with water to make a slurry and preparation autoclaved for 3½ hours | | | | | | 22.3 (dry weight). |
| FG-11 | Formula and procedure same as FG-10₁,₂ | | | | | | 8.50 (dry weight). |
| FG-12 | 2 | 8 | 8 | | | 48 hrs.³ | Very little reaction as indicated by the light colors. |
| FG-12₂ | 2 | 8 | 8 | 6½ hrs | | 4 hrs.³ | 10.3 (dry weight). |
| | After the 2½ hours on steam, 50 ml. water and 5 gm. reduced iron were added and the preparation steam bathed for 4 hours more and filtered. | | | | | | |
| FG-13 | 50 | 250 | 200 | | | 4 hrs.³ | 2.94 (dry weight). |
| FG-13₂ | 50 | | | 5 hrs | 18 hrs | | 5.72 (dry weight). |
| FG-13₃ | 50 | 200 | | | 14 hrs | | |
| FG-13₄ | 25 | | | 2 hrs | 42 hrs | | 10.6 (dry weight). |
| FG-13₅ | 25 | 200 | | | | 1 hr | 13.4 (dry weight). |
| FG-13₆ | 20 ml. concentrated NH₄OH added, heated on steam bath for ½ hr. | | | | | | 22.3 (dry weight). |
| FG-14 | 50 | 200 | 100 | ½ hr | | (20 ml. conc. NH₄OH) 1½ hr | |
| FG-14₂ | | 2,000 | | 2½ hrs | | 1 hr | 0.512 (dry weight). |
| FG-14₃ | | 800 | | 4½ hrs | | | |
| FG-15 | 100 | 750 | 500 | 4 hrs | | 1½ hr | (¹). |
| FG-15₁ | | 1,500 | | | | 1 hr | 1.52 (dry weight). |
| FG-16 | 100 | 1,000 | 500 | 4½ hrs | 18½ hrs | 1 hr | |
| FG-16₁ | 100 | | | 1½ hrs | | | |
| FG-16₂ | 50 | 50 | | 17½ hrs | | | 5.42 (dry weight). |
| FG-16₃ | | 500 | | 2½ hrs | | | 7.62 (dry weight). |
| FG-16₄ | 50 | | | 20 hrs | | | 7.33 (dry weight). |
| FG-16₅ | 50 | | | 19 hrs | | | |
| FG-16₆ | | 300 | | 5½ hrs | 17½ hrs | | 7.48 (dry weight). |
| FG-16₇ | 50 | (50 ml. conc. NH₄OH) | | 2 hrs | | | 8.93 (dry weight). |
| FG-16₈ | | 50 | | | 42 hrs | 3 hrs | |
| FG-17 | 100 | 750 | 500 | 2½ hrs | | | |
| FG-17₂ | | 1,500 | | ½ hr | 18½ hrs | 1 hr | |
| FG-17₃ | 100 | (250 ml. conc. NH₄OH) | | 19½ hrs | | | |
| FG-17₄ | | 2,000 | | 17 hrs | | 2 hrs | 3.12 (dry weight). |
| FG-17₅ | 50 | 150 | | 29 hrs | | 1 hr | |
| FG-17₆ | 50 | 50 | | 16 hrs | | | |
| FG-17₇ | | 300 | | 48 hrs | | | 3.72 (dry weight). |
| FG-17₈ | 200 | | | 4 hrs | 18½ hrs | 92 hrs | 4.22 (dry weight). |
| FG-18 | 25 | 50 | 100 | 19½ hrs | | | |
| FG-18₂ | 25 | 350 | | 4 hrs | | 1 hr | 5.73 (dry weight). |
| FG-18₃ | 75 | 350 | | | | 1 hr | 8.17 (dry weight). |
| FG-18₄ | 50 | | | | | 1 hr | 9.93 (dry weight). |
| FG-18₅ | 25 | | | 3 hrs | | ½ hr | 10.2 (dry weight). |
| FG-18₆ | 25 | | | | | ½ hr | 11.42 (dry weight). |
| FG-18₇ | 25 | | | | | 1 hr | 12.13 (dry weight). |
| FG-18₈ | 25 | | | | | 2½ hr | |
| FG-18₉ | (25 ml. conc. NH₄OH) | | | 10 hrs | | | 8.53 (dry weight) |
| FG-19 | 25 | 50 | 100 | 17½ hrs | | | |
| FG-19₂ | 25 | 550 | | 7 hrs | | | 3.06 (dry weitgh). |
| FG-19₃ | 25 | 250 | | 1 hr | | 1 hr | 5.06 (dry weight). |
| FG-19₄ | 25 | 200 | | | | 1 hr | 6.28 (dry weight). |
| FG-19₅ | 50 | | | ¼ hr | | 1 hr | 9.13 (dry weight). |
| FG-19₆ | 25 | | | 3 hrs | | ½ hr | 9.30 (dry weight). |
| FG-19₇ | 25 | | | | | ½ hr | 9.31 (dry weight). |
| FG-19₈ | | | | ½ hr | | | 9.33 (dry weight). |
| FG-19₉ | | 25 | | | | ½ hr | 11.33 (dry weithg). |
| FG-19₁₀ | | 25 | | | | ½ hr | 11.30 (dry weight). |
| FG-19₁₁ | | | | 2 hrs | | 1 hr | 11.93 (dry weight). |
| FG-19₁₂ | | 250 | | | | 1 hr.³ | 12.30 (dry weight). |
| FG-19₁₃ | Evaporated to 100 ml. and treated with 600 ml. of 95% ethanol to precipitate the gelatin iron complex. Precipitate heated over steam to remove ethanol and redissolved in distilled water (200 ml.) | | | | | | 14.10 (dry weight.) |
| FG-20 | 50 | 1,500 | 200 | 6 hrs | | | |
| FG-20₂ | 50 | | | | | 1 hr | |
| FG-20₃ | 50 | (20 ml. conc. NH₄OH) | | 2 hrs | | | |
| FG-20₄ | 100 | | | ¼ | | 1 hr | 1.96 (dry weight). |
| FG-20₅ | 50 | | | 2 hrs | | ½ hr | 2.32 (dry weight). |
| FG-20₆ | | 2,000 | | 1 hr | 17 hrs | | 4.03 (dry weight). |
| FG-20₇ | 25 | | | 12½ hrs | | 3½ hrs | 5.15 (dry weight). |
| FG-20₈ | 50 | | | 3 hrs | | 1 hr | |
| FG-20₉ | | | | 23 hrs | | | 13.07 (dry weight). |
| | Material evaporated to semisolid mass and treated with 95% ethanol (500 ml.) to precipitate the gelatin-iron complex, dissolved in 150 ml. water and again treated with 95% ethanol (500 ml.). Supernatant was discarded | | | | | | 9.68 (dry weight). 11.50 (dry weight). |
| FG-20₁₀ | 25 | | | 5 hrs | | 1 hr | |
| FG-20₁₁ | Treated with 95% ethanol (650 ml.) to precipitate gelatin-iron complex. The precipitate was treated twice with 100 ml. of 95% ethanol. The supernatant was discarded, the ethanol evaporated and the precipitate dissolved in enough distilled water to make a solution containing 5% elemental iron | | | | | | 12.22 (dry weight). 14.80 (dry weight). |

POLYVINYLPYRROLIDONE

| Run[a] | Reduced iron gm. | Material, distilled water, ml. | Gelatin, gm. | Steam bathing | Treatment oven 60° C. | Autoclave 20 lbs./sq. in. | Analysis, percent of elemental iron (Fe) |
|---|---|---|---|---|---|---|---|
| PVP-Fe-1 | 5 | 20 | [b] 20 | | 18 hrs | 2 hrs | 0.527 (dry weight). |
| PVP-Fe-2 | 25 | 1,000 | [b] 100 | ½ hr | | 3 hrs | Color indicated little reaction occurred. |
| PVP-Fe-1₂[1] | PVP-Fe-1 diluted to 200 ml. with water, evaporated on a steam bath, 5 gm. of reduced iron added and the material autoclaved for 1 hour at 20 lbs. of pressure per sq. in. Later it was placed in a 60° C. oven for 18 hours | | | | | | 1.50 (dry weight). |
| PVP-Fe-2₂ | 5 gm. reduced iron added to PVP-Fe-2 product | | | 2 hrs | 18 hrs | | 1.29 (dry weight). |
| PVP-Fe-2₃ | 10 gm. reduced iron added to PVP-Fe-2₂ product | | | | | 1 hr | 1.735 (dry weight). |
| PVP-Fe-2₄ | 50 gm. reduced iron added to PVP-Fe-2₃ product | | | 2½ hrs | | 2½ hrs | 1.87 (dry weight). |
| PVP-Fe-2₅[3] | 50 gm. reduced iron added to PVP-Fe-2₄ product | | | | 1 hr | 1½ hr | 3.04 (dry weight). |

[1] Discarded.  [2] Sealed in 100 ml. vials.  [3] Filtered.
[a] Subscripts indicated further treatment of previous product; e.g., FG-10₂ is further processing of FG-10.
[b] Amount of PVP instead of gelatin.

ANALYSIS OF THE RESULTS

An important consideration was found to be the maintenance of a large surface area of iron in contact with a large surface area of gelatin or PVP. This was obtained by using a high concentration of iron and gelatin or PVP in water in order to suspend the iron particles as long as possible during the heating process; however, such high concentrations were found to foam readily and it was desirable to carry out the process in the sealed pressure kettle containing a stirrer. It was also found desirable to add small amounts of fresh reduced iron intermittently during the heating and steam bathing process. This procedure appreciably increased the percentage of elemental iron in the final products. The general effect of heating appears to enhance the complexing of the iron, whether it is steam bathing or autoclaving; however, autoclaving appears helpful in reducing the gel-strength of the product to prevent it from gelling at room temperature. It was found that gelatin, when autoclaved as long as thirty minutes at twenty pounds of pressure, loses gel strength and tendency to gel at room temperature. As much as 62% gelatin in aqueous solution can be maintained in a liquid state at room temperature if it has been subjected to autoclaving for a sufficient time. The results further showed that the use of only the minimum amount of water necessary to carry out the reaction was effective in increasing the amount of iron complexed in the reaction.

By carrying out the reaction as outlined above, i.e., reacting gelatin or PVP with reduced iron in the minimum amount of distilled water required to carry out the reaction, alternately heating the reactants in an autoclave at 20 p.s.i., pressure, steam bathing at 100° C. and heating in an oven at 60° C. while intermittently adding small amounts of fresh reduced iron, a gelatin-iron complex product as high as 22.3% elemental iron and a PVP-iron complex as high as 3.04% elemental iron have been obtained. An investigation was made of the effects on the complex yield of the addition of concentrated ammonium hydroxide to the reactants during the reaction. The results indicated that the addition of ammonium hydroxide increases the product yield. However, even the preparations having the highest percentage of elemental iron are stable and addition of an alkali for stability has been unnecessary.

The minimal dilution in which iron complexing occurred satisfactorily was 1 part water to 2.5 parts solid and the maximal dilution in which good results were obtained was 13.3 parts water to 1 part solids. The minimal and maximal ratio of iron to gelatin were 1:4 and 6.67:1 respectively. Although the above ranges were minimal and maximal, they are not the limits under which the reactions can occur. The minimum temperature for effective reaction of PVP or gelatin with iron is 60° C. The best results were obtained at the highest temperature used, 127° C. The reaction is much faster and higher yields of elemental iron complexed are found in the reactions at higher temperatures.

ALTERNATIVE PROCEDURE

An alternative procedure has been developed for producing the iron gelatin complex which eliminates the requirement of autoclaving or extensive heating to foster the reaction, thus considerably reducing the process time for production of the finished complex and alleviating difficulties of foaming and spilling encountered in the autoclaving method. This procedure contemplates partial hydrolysis of the gelatin with the use of acid prior to the reacting of it with reduced iron.

Using this procedure, good yields of product have been produced after reacting the iron with partially hydrolyzed gelatin in a steambath for 7 hours. The gelatin is first brought into the suspended state by heating and stirring it in water. Concentrated HCl is then added and the mixture is heated for a short time over a steam bath. Alternatively, these two steps may be combined by adding the gelatin directly to an acid solution. After the mixture has been heated for a short time, the gelatin markedly loses viscosity, changing from a very viscous to a quite fluid state. At this point the heating is stopped and the gelatin is precipitated from the solution by the addition of ethanol and acetone. The precipitated partially hydrolyzed gelatin may then be separated from the solution by decantation. Reduced iron and water are added to the partially hydrolyzed gelatin and the mixture is heated over a steambath. More reduced iron and water is added intermittently until the solution takes on a dark reddish brown appearance and further addition of iron does not affect the color perceptibly. The product complex is then treated in the same manner as the product obtained through the autoclaving method to produce injectable solutions of iron complex. The addition of iron is usually stopped when the complex reaches a concentration of approximately 12 to 13% elemental iron.

The acid of choice for the purposes of this invention is HCl, but other suitable acids such as $H_2SO_4$, $HNO_3$ and their obvious chemical equivalents may be used. The only essential requirement is to obtain a suitably acidic solution to carry out the hydrolysis, using an acid which will not cary on detrimental side reactions with the gelatin.

The time and intensity of hydrolysis is critical only insofar as the gelatin must be hydrolyzed at least an appreciable extent and cannot be hydrolyzed to such a degree that the gelatin breaks down completely to its simple sugar and amino acid constituents. The best results obtained have been upon hydrolysis of gelatin in a moderately strong HCl solution for ten minutes with gentle heating and stirring over a steam bath.

COBALT AND COPPER ADDITIVES

It has been found that addition of cobalt and copper salts to the injectable solutions of gelatin complex in the well-known manner increases the assimilation and utilization of the complexed iron in the blood. Copper and cobalt salt solutions may be added alone or in combination to the injectable solutions of gelatin and PVP iron complexes prepared in accordance with the present invention. I prefer to add copper and cobalt as the acetate. Reports in the literature suggest that additions within the ranges of 0.01 mg. to 2.5 mg. cobalt or 0.01 mg. to 5 mg. copper or combinations thereof per therapeutic dosage of iron produce a perceptible increase of assimilation of the iron by the hemopoietic system.

METHOD OF ASSAY

At various stages during the reaction, approximately 10 ml. of an aliquot of the material was diluted with water if necessary and passed through a Whatman No. 40 filter. The filtrate was dried at least 1 hour over a steambath and 0.25 gm. of the material burned down in a crucible for 15 to 30 minutes. The residue was taken up with 5 to 15 ml. of concentrated hydrochloric acid and placed on a steambath until all the residue had gone into solution. The solution was then assayed according to the colorimetric method of Wong using ferrous ammonium sulfate as a standard. Samples are acidified with sulfuric acid, oxidized with potassium permanganate and treated with potassium thiocyanate to produce a red color which is read on the Klett colorimeter using a No. 54 filter.

PRODUCTS

When colloidal solutions prepared in accordance with my invention are dehydrated as, for example, by evaporation in a steambath, or, alternatively, by the separation and subsequent desiccation of the product obtained on precipitating the colloid by adding a suitable water-miscible solvent such as methyl alcohol, ethyl alcohol or acetone, there can be obtained solidified preparations suitable for the immediate reconstitution of colloidal injectable iron solutions by the addition of distilled water.

The only purification required of the reaction products in order to obtain colloidal solutions suitable for intramuscular injection is filtration of the products to separate the uncomplexed iron particles. The colloidal solutions may then be diluted or concentrated so that they contain the desired percentage of elemental iron, a 5% solution being preferred by us. If the pH of the colloidal iron preparation falls outside the desirable ranges 5.5 to 8.5 sufficient acid or alkali, as the case may be, may be added to ensure that a pH value falling within these limits, and preferably 6.5 is finally obtained for clinical use. Further sterilization is usually necessary unless sterile filtration and adustment of pH is carried out. I prefer to sterilize by autoclaving the product in 10 cc. vials for 15 minutes at 15 pounds per square inch of pressure after adding phenol 0.5% for preservation.

TESTS

As shown in Table II, preparations of both the PVP and gelatin complexes obtained according to our process tested for intravenous toxicity in mice, show toleration in mice in excess of 500 mg. per kg. without apparent side effects. This compares favorably with an $LD_{50}$ value of 600 mg. per kg. of dextran iron preparation tested under similar conditions. On injecting either of the gelatin or the PVP colloidal parenteral iron preparation made in accordance with this invention into mice by the intramuscular route, it has been found possible to administer a dosage as high as 300 mg. per kg. without killing any of the test mice or causing any apparent toxicity as shown in Table II below:

TABLE II

| Run | Mouse No. | Dose mg. Fe/kg.[a] per kg. body weight | Ml. of soln. per kg. of body weight | Route of administration [b] | Remarks |
| --- | --- | --- | --- | --- | --- |
| FG-2 | 1 | 52.7 | 7.0 | I.V. | No toxic effects, animal survived. |
| FG-2 | 2 | 150.4 | 20.0 | I.V. | Do. |
| FG-2 | 3 | 15.0 | 2.0 | S.Q. | No toxicity. Autopsy after 1 day-jelly-like precipitate at site of injection. |
| FG-2 | 4 | 45.2 | 6.0 | S.Q. | No toxicity. Autopsy after 2 days-brown stain at site of injection. |
| FG-2 | 5, 6 | 75.3 | 10.0 | S.Q. | Do. |
| FG-2 | 7 | 300.0 | 39.8 | S.Q. | Injection did not get into subcutaneous tissue. |
| FG-2 | 8-13 | 300.0 | 39.8 | S.Q. | All animals survived. Animals killed over a 1-8-day period. Brown staining of tissue appeared in all animals and gradually became less until the 8th day when about ½ the area of stain removed. |
| FG-8 | 14 | 500.0 | 39.9 | I.V. | Animal survived. Injection produced an initial gasping action but quickly recovered. The eyes, feet and ears showed a dark coloration but was not apparent after 3 days. |
| FG-10₃ | 15 | 50.0 | .22 | I.V. | Survived—no coloration of tissue as with FG-8. No toxic symptons. |
| FG-10₃ | 16 | 500.0 | 2.24 | I.V. | Survived—Coloration of tissue similar to FG-8 but no toxic symptoms. Coloration disappeared after 3 days. |
| FG-10₃ | 17 | 1,000.0 | 4.48 | I.V. | Survived—Increased motor activity lasting about 1 minute. Coloration of tissue as above lasting for 5 days. |
| FG-10₃ | 18 | 1,500.0 | 6.72 | I.V. | Lethal—Increased central nervous system activity. |
| PVP-Fe-25 | 19 | 500.0 | 50.0 | I.V. | Transitory breathing difficulty. Ear, nose, eyes and feet coloration due to systemic circulation of the drug. Color disappeared after 4 days. |
| PVP-Fe-25 | 20 | 500.0 | 50.0 | I.V. | Do. |
| PVP-Fe-25 | 21 | 500.0 | 50.0 | I.V. | Same as above except color disappeared in 5 days. |
| PVP-Fe-25 | 22 | 500.0 | 50.0 | I.V. | Same as in Mouse No. 20. |
| PVP-Fe-25 | 23 | 500.0 | 50.0 | I.V. | Do. |
| PVP-Fe-25 | 24 | 500.0 | 50.0 | I.V. | Do. |
| PVP-Fe-25 | 25 | 500.0 | 50.0 | I.V. | Drug injected slowly. Breathing difficulty not as apparent. Coloring of the ears, nose, eyes and feet disappeared after 5 days |
| PVP-Fe-25 | 26 | 500.0 | 50.0 | I.V. | Do. |

[a] Mg. Fe/kg.—Amount of Fe in milligrams supplied as a solution of the complex which is expressed on a 1 kilogram of body weight basis.
[b] I.V.—Intravenously in the tail vein; S.Q.—subcutaneous.

*Evidence for absorption of gelatin-iron complex.*—Preparations of iron administered to animals with normal hemoglobin levels do not elevate this level further under normal conditions. However, excessive iron which enters the bloodstream is stored to some extent especially in the liver, red bone marrow and the spleen.

An experiment was designed to determine absorption of iron after subcutaneous injection by the amount of iron stored in the liver and spleen. Although not expected to be changed, hemoglobin determinations were also made.

METHOD

Twelve white Swiss female mice weighing 18–26 gm. were injected subcutaneously with a solution of FG–10$_3$ (5% Fe) using a dosage of 250 mg. Fe/kg. Twelve mice were used as controls. At 2 days and 8 days after injection, respectively, 6 mice from the drug group and 6 from the control group were decapitated and blood collected into oxalated test tubes. Assays of elemental iron in the iron and spleen were made by the method used for iron complex which was previously described. Hemoglobin determinations were made using the Hellige apparatus in which hematin is formed with .1 N HCl and matched with fixed color standards.

RESULTS

The data in Table III shows that FG–10$_3$ administered subcutaneously does not significantly alter the hemoglobin or the iron content of the spleen. Two days after injection, the iron content of the liver was increased by 240% over controls. Eight days after injection, the iron of the drug-treated mice was only 32% greater than controls which is probably not significant. These results indicate that iron is absorbed from the site of injection, is stored in the liver and is gradually lost by the 8th day following the injection.

TABLE III

*Iron Content of Tissues [a] and Hemoglobin Levels After Subcutaneous Injection of 250 mg. Fe/kg. as FG–10$_3$*

POST 2 DAY ANALYSIS

Control

| Mouse Nos. | Mouse weight, gm. | Hemoglobin gm./ 100 ml. | Spleen Weight, gm. | Spleen Mcg.[c] Fe/gm. | Liver Weight, gm. | Liver Mcg.[c] Fe/gm. |
|---|---|---|---|---|---|---|
| 1–2 | 23–26 | 12.5 | .4200 | 1,000 | 2.8707 | 170 |
| 3–4 | 27–26 | 11.0 | .6244 | 635 | 3.6632 | 163 |
| 5–6 | 24–26 | 10.5 | .5521 | 412 | 3.3290 | 122 |
| Mean | | 11.3 | | 682 | | 152 |

FG–10$_3$

| 1–2 | 18–18 | 10.0 | .5150 | 717 | 2.3970 | 594 |
| 3–4 | 20–24 | 11.5 | .5520 | 372 | 2.8310 | 472 |
| 5–6 | 23–22 | 14.0 | .4810 | 752 | 2.9090 | 484 |
| Mean | | 11.8 | | 614 | | 517 |

POST 8 DAY ANALYSIS

Control

| 1–2 | 20–24 | 12.0 | .6457 | (b) | 3.0930 | 185 |
| 3–4 | 26–20 | 11.5 | .5013 | 623 | 3.0965 | 284 |
| 5–6 | 26–22 | 11.0 | .6962 | 1,033 | 3.2671 | 197 |
| Mean | | 11.8 | | 828 | | 222 |

FG–10$_3$

| 1–2 | 25–27 | 13.5 | .5382 | 700 | 4.1166 | 345 |
| 3–4 | 24–27 | 13.0 | .5240 | 370 | 3.1299 | 217 |
| 5–6 | 26–24 | 13.0 | .5744 | (b) | 3.4527 | 321 |
| Mean | | 13.2 | | 535 | | 294 |

[a] The blood and tissues from 2 mice were pooled for each determination.
[b] Samples lost during burning off process.
[c] Mcg.—micrograms Fe per gm. of tissue.

COMPARISON OF ROUTES OF ADMINISTRATION AND RESULTS OF ADDITION OF COPPER AND COBALT SALTS

Studies were conducted to compare the new gelatin iron complex with iron dextran complex, to compare routes of administration of the new complex and to study the effect of the addition of cobalt and copper compounds to the injectable solutions of the new iron complex upon the rate of assimilation and utilization of the complex by the bloodstream. Tests were conducted upon 100 female CF Wister rats, each weighing from 50 to 65 grams. These rats were prepared for testing by being placed in plastic cages and maintained on a diet of powdered whole milk and distilled water for a period of ten weeks. The rats were then grouped into eight separate groups of ten to fifteen rats per group, the rats in seven of the groups being selected so that the mean hemoglobin level for each group was approximately the same. All of the rats having hemoglobin levels over 13 grams per hundred ml. of blood were placed into the eighth group, the group used as a control. The rats in groups 2, 3, 4 and 5 were each injected intramuscularly in the right thigh in the area of the adductor magnus muscle with a dosage of 2 ml. per kg. of body weight of the following compounds, respectively: Group 2, Armidexan containing 100 mg. elemental iron as dextran complex per 2 ml.; group 3, FG–20 containing 100 mg. elemental iron as the gelatin complex per 2 ml.; group 4, FG–20 Cu containing 100 mg. of elemental iron as the gelatin complex and 2 mg. of elemental copper as the copper acetate per 2 ml.; and group 5, FG–20 Co containing 100 ml. of elemental iron as the gelatin complex and 2 ml. of elemental cobalt as cobaltous acetate per 2 ml. To each of the rats in group 6 the same dosage of FG–20 as indicated above for group 3 was administered orally. And to each rat in group 7 the same dosage of FG–20 indicated for groups 3 and 6 was intravenously administered. Group 1 was maintained as an iron-deficient control group by continuing the rats therein on a powdered whole milk diet. Group 8 was started at this point upon a normal diet of Purina Chow. Groups 1 through 7 were continued upon their whole milk diet for 11 weeks during which hemoglobin levels and weight changes were recorded for each of the groups at week intervals. A diet of non-fat milk was substituted for the powdered milk for a period of 2½ weeks beginning at 3½ weeks to 6 weeks following the administration of iron. This was done in order to illustrate the relationship of weight change to actual hemoglobin levels and its significance.

The data in Table IV show the weekly means weights of each group of animals and that in Table V shows the mean hemoglobin level in each group of rats. Comparison of the mean weights and the hemoglobin levels during the 2½ week period of the non-fat diet shows that when weight loss occurs hemoglobin levels are abruptly elevated. This would indicate that the inter-relation of lowered hemoglobin levels and body weight is quite significant in analyzing the actual effects of the administration of iron. Thus, Table VI has been prepared to show the total body hemoglobin corresponding to the weights and lowered hemoglobin levels recorded in Tables IV and V. These values were calculated by multiplying the hemoglobin levels as shown in Table V by the corresponding weights shown in Table IV by 4.59%, an accurate blood volume percentage as suggested by T. A. Sollman, Manual of Pharmacology, 8th Edition, 1957, page 1018, W. B. Saunders Company, Philadelphia.

A comparison of the groups 3, 4, 5 and 7 in Table V indicates that the presence of copper or cobalt increases the absorption of FG–20 from the intramuscular site as shown by the more rapid initial hemoglobin formation in group 4 and the subsequent similar levels of groups 3, 4 and 7 at the end of 11 weeks. There appear to be some positive results in the addition of cobalt but they are not as pronounced as those for copper addition.

A comparison of groups 3, 6 and 7 with iron deficient control group 1 shows that administration of the iron gelatin complex either orally, intravenously or intramuscularly is effective in raising the iron level of the blood, although the intravenous route appears to be the most effective. Overall comparisons of the iron dextran (Armidexan) and iron gelatin complex in Tables IV, V and VI shows that the new iron gelatin complex is as good or better in increasing hemoglobin formation in the blood and in promoting growth of the animals.

TABLE IV
*The Effect of Different Parenteral Iron Preparations in a Dosage of 100 mg. Fe/kg. on Mean Weight Change in Grams in Iron-Deficient Female Rats*

| Group No | 1 | 2 | 3 | 4 | 5 | 6 | 7 | 8 |
|---|---|---|---|---|---|---|---|---|
| Number of rats | 11 | 10 | 11 | 12 | 11 | 11 | 13 | 14 |
| Treatment | [1] Control | ([2]) | FG-20 | FG-20 Cu | FG-20 Co | FG-20 | FG-20 | [3] Control |
| Route of administration |  | [b] IM | IM | IM | IM | Oral | [c] IV |  |
| DATE |  |  |  |  |  |  |  |  |
| 2-18 | 105 | 101 | 105 | 107 | 105 | 103 | 102 | 92.3 |
| 2-25 | 109 | 115 | 118 | 124 | 121 | 118 | 122 | -------- |
| 3-4 [a] | 123 | 126 | 132 | 136 | 131 | 128 | 134 | -------- |
| 3-11 [a] | 131 | 137 | 139 | 146 | 137 | 136 | 141 | -------- |
| 3-18 [a] | 133 | 137 | 136 | 147 | 147 | 129 | 145 | 167 |
| 3-25 | 123 | 131 | 133 | 143 | 143 | 124 | 159 | 161 |
| 4-1 | 110 | 130 | 126 | 133 | 133 | 129 | 132 | 171 |
| 4-8 | 134 | 154 | 153 | 162 | 157 | 145 | 160 | 171 |
| 4-15 | 150 | 156 | 159 | 168 | 166 | 149 | 167 | 183 |
| 4-22 | 161 | 166 | 168 | 178 | 172 | 157 | 175 | 191 |
| 4-27 | 164 | 168 | 170 | 177 | 172 | 163 | 178 | 191 |
| Net gain | 59 | 67 | 65 | 70 | 67 | 60 | 76 | 98.7 |

[1] Control, none.  [2] Armidexan.  [3] Control, regular diet (Purina Chow).
[a] Date represents time of feeding non-fat powder milk diet.  [b] Intramuscular.  [c] Intravenous.

TABLE V
*The Effect of Different Parenteral Iron Preparations in a Dosage of 100 mg. Fe/kg. on Mean Hemoglobin Level (gm./100 ml. Blood) in Iron-Deficient Female Rats*

| Group No | 1 | 2 | 3 | 4 | 5 | 6 | 7 | 8 |
|---|---|---|---|---|---|---|---|---|
| Number of rats | 11 | 10 | 11 | 12 | 11 | 11 | 13 | 14 |
| Treatment | [1] Control | ([2]) | FG-20 | FG-20 Cu | FG-20 Co | FG-20 | FG-20 | [3] Control |
| Route of administration |  | [b] IM | IM | IM | IM | Oral | [c] IV |  |
| DATE | (d) | (d) | (d) | (d) | (d) | (d) | (d) | (d) |
| 2-18 | 11.14 | 11.11 | 11.16 | 11.00 | 10.90 | 11.03 | 11.21 | 14.11 |
| 2-25 | 7.89 | 11.63 | 8.97 | 10.93 | 9.47 | 10.36 | 10.59 | -------- |
| 3-4 | 7.21 | 12.96 | 9.42 | 11.70 | 9.47 | 9.54 | 11.37 | -------- |
| 3-8 | 7.04 | 12.37 | 9.51 | 11.27 | 9.20 | 8.99 | 10.80 | -------- |
| 3-11 [a] | 6.35 | 12.53 | 10.03 | 11.61 | 9.60 | 9.13 | 11.76 | 13.99 |
| 3-25 [a] | 7.43 | 14.30 | 12.48 | 14.12 | 11.27 | 9.63 | 12.78 | 14.54 |
| 4-1 [a] | 7.93 | 13.55 | 12.64 | 14.14 | 11.71 | 9.65 | 14.58 | 15.14 |
| 4-8 | 7.22 | 13.16 | 11.94 | 12.45 | 11.00 | 8.52 | 12.06 | 15.14 |
| 4-15 | 7.17 | 13.07 | 12.45 | 12.51 | 11.06 | 9.00 | 12.22 | 14.93 |
| 4-22 | 8.29 | 12.36 | 12.07 | 12.16 | 11.52 | 11.09 | 12.04 | 14.00 |
| 4-29 | 9.05 | 12.53 | 12.60 | 12.32 | 11.71 | 11.80 | 12.21 | 14.76 |
| Net gain | −2.09 | +1.42 | ±1.44 | +1.32 | +0.81 | +0.77 | +1.00 | +0.65 |

[1] Control, none.  [2] Armidexan.  [3] Control, regular diet (Purina Chow).
[a] Date represents time of feeding non-fat powder milk diets.
[b] Intramuscular.  [c] Intravenous.  [d] Mean hemoglobin level (gm./100 ml. blood).

TABLE VI
*The Effect of Different Parenteral Iron Preparations Using a Dosage of 100 mg. Fe/kg. on Mean Total Blood Hemoglobin in mg. per Rat, in Iron-Deficient Female Rats*

| Group No | 1 | 2 | 3 | 4 | 5 | 6 | 7 | 8 |
|---|---|---|---|---|---|---|---|---|
| Number of rats | 11 | 10 | 11 | 12 | 11 | 11 | 13 | 14 |
| Treatment | [1] Control | ([2]) | FG-20 | FG-20 Cu | FG-20 Co | FG-20 | FG-20 | [3] Control |
| Route of administration |  | [b] IM | IM | IM | IM | Oral | [c] IV |  |
| DATE | (d) | (d) | (d) | (d) | (d) | (d) | (d) | (d) |
| 2-18 | 536 | 518 | 540 | 539 | 519 | 520 | 524 | 598 |
| 2-25 | 392 | 610 | 441 | 622 | 525 | 561 | 590 | -------- |
| 3-4 | 405 | 750 | 571 | 731 | 567 | 562 | 697 | -------- |
| 3-11 [a] | 422 | 771 | 606 | 760 | 580 | 561 | 701 | -------- |
| 3-18 [a] | 386 | 788 | 624 | 780 | 645 | 540 | 781 | 1,032 |
| 3-25 [a] | 419 | 859 | 760 | 929 | 735 | 550 | 931 | 1,113 |
| 4-1 | 398 | 810 | 731 | 863 | 697 | 570 | 880 | 1,192 |
| 4-8 | 443 | 931 | 938 | 925 | 794 | 568 | 885 | 1,192 |
| 4-15 | 493 | 931 | 910 | 963 | 840 | 617 | 935 | 1,257 |
| 4-22 | 605 | 940 | 928 | 995 | 906 | 801 | 970 | 1,278 |
| 4-29 | 681 | 965 | 979 | 983 | 928 | 884 | 995 | 1,296 |
| Net gain | +145 | +447 | +439 | +444 | +407 | +364 | +471 | +698 |

[1] Control, none.  [2] Armidexan.  [3] Control, regular diet (Purina Chow).
[a] Date represents time of feeding non-fat powdered milk diet.
[b] Intramuscular.  [c] Intravenous.  [d] Mean total blood hemoglobin per rat, mg.

PROPERTIES

The dry materials ($FG-10_3$ and $FG-13_6$) are magnetic as determined by placing in a magnetic field. This unique property also is characteristic of ferritin, a natural storage form of iron in the body.

The pH influence on the products are shown as follows:

5% aqueous solutions of $FG-10_3$ and $FG-13_6$ were prepared.

One ml. of each was placed into 50 ml. of water. 1 N HCl was added followed by 1 N NaOH to obtain the pH's below.

|  | Initial pH | 1 N HCl pH adjusted | 1 N NaOH pH adjusted |
| --- | --- | --- | --- |
| FG-10 | 5.50 | 2.0 | 12.0 |
| FG-13 | 5.90 | 2.2 | 12.0 |

No change in color or precipitation of the solutions occurred. No change in color occurred when heated at pH 2; however, when excess acid is added to the samples, the color changes to a yellow similar to ferric chloride solution. Neutralization with NaOH does not restore the original brown color. The results indicate that the pH of gelatin-iron complexes can be altered without precipitation or degradation. This is important in the adjustment of pH of the preparation to that of body fluids.

EXAMPLES

The following are examples by way of illustration only of preparations in detail according to the invention:

Example 1

As shown in Table I in runs FG-10 through $FG-10_3$, to 100 gm. of U.S.P. edible gelatin dissolved in 50 ml. of distilled water, was added 25 gm. of N.F. grade reduced iron. The mixture was heated on a steambath for one and one-half days, diluted with 200 ml. of water and filtered. A sample was dried and assayed showing 2.61% elemental iron. The material was further concentrated by steam bathing down to a semi-solid mass and then autoclaved for ninety minutes at 20 p.s.i. pressure at 127° C. The material was then diluted with 200 ml. of distilled water, reconcentrated to a thick mass by 3 hours on a steambath using an air stream. 25 gm. more reduced iron was added to the material and it was further autoclaved for 45 minutes. At this point, an analysis of a small portion of the material was made, showing the elemental iron concentration to be 8.6%. The mixture was then evaporated to dryness on a steambath, 25 gm. more reduced iron was added with water to make a slurry and the preparation was autoclaved for 3½ hours. A final analysis was made after filtering the product by precipitating the gelatin-iron complex with ethanol (95%) and assaying the precipitate after drying it over a steambath. The analysis showed 22.3% elemental iron in the precipitate. The pH of the final product was found to be 5.50. This product was then diluted with distilled water to make a clear, brown stable solution containing the equivalent of 5% elemental iron. Phenol 0.5% was added for preservation. The material was placed into 10 cc. vials, and sterilized by autoclaving for 15 minutes at 15 p.s.i.

This material was then tested for intravenous toxicity in mice by injecting four mice with dosages respectively of 50, 500, 1000 and 1500 mg. Fe per kg. All of the dosages were tolerated except the 1500 mg. Fe per kg. dosage. Six mice were injected subcutaneously with a dosage of 250 mg. Fe per kg. to measure the absorption of iron complex. Analysis of the livers of the injected mice two days after injection showed a mean of 240% more iron in the liver compared with that of six control mice. Hemoglobin comparison revealed no significant change in iron content of the blood. No apparent side effects were caused by the subcutaneous injection of the gelatin-iron complex.

Example 2

As shown in Table I, in runs PVP-Fe-2 through PVP-$Fe-2_5$, to a solution of 100 gm. of PVP in 1,000 ml. of water was added 25 gm. of reduced iron. The material was heated for thirty minutes in a 4000 ml. flask over a steambath. It was then autoclaved for three hours at 20 p.s.i. pressure and 127° C. The material was then filtered and 5 gm. of freshly reduced iron added. The material was further treated by placing in a 60° C. oven for 18 hours and then heated on a steambath for two hours to evaporate using an air stream. At this point the material assayed at 1.9% Fe. 10 gm. fresh reduced iron was added, the preparation was autoclaved for one more hour and then filtered. Analysis of a small amount of the material showed 1.7% Fe. After adding 50 gm. additional reduced iron, the material was placed on a steambath for one hour, autoclaved for one hour and placed on the steambath for one and one-half hours. A sample assayed 1.87% Fe. An additional 50 gm. of reduced iron was again added and the preparation placed in the 60° C. oven for one hour and autoclaved for one and one-half hours. Upon filtration, the final product assayed at 3.04% Fe. A 1% Fe solution of the final product was prepared by addition of distilled water to the final product. A dosage of 500 ml. Fe per kg. was administered intravenously to each of eight mice and of 300 ml. Fe per kg. subcutaneously to each of four mice. All of the mice tolerated the dosage either intravenously or subcutaneously without adverse symptoms.

Example 3

As shown in Table I, runs FG-13 through $FG-13_6$, to a solution of 200 gm. U.S.P. edible gelatin in 250 ml. water was added 50 gm. of reduced iron. The mixture was autoclaved for 4 hours at 20 pounds per square inch pressure and 127° C. and then filtered. 50 additional gm. of reduced iron was added and the mixture was heated in an oven at 60° C. for 18 hours and then placed on a steam bath for five hours. Fifty gm. more reduced iron was added plus 200 ml. additional distilled water and the material was further heated in the oven for 14 hours. 25 gm. of additional reduced iron was added and the material was placed on a steambath for 2 additional hours and then in the oven at 60° C. for 42 hours. A final addition of 25 gm. of reduced iron was made with 200 ml. distilled water and the material was autoclaved for one hour. At this point the material analyzed at 13.4% reduced iron. After addition of 20 ml. concentrated ammonium hydroxide, the material was heated on a steam bath for ½ hour and then filtered. The analysis of the final product showed an elemental iron concentration of 22.3%.

Example 4

200 gm. of gelatin were mixed with 150 ml. distilled water in a larger beaker and placed over a steambath for ten minutes. Fifty ml. of concentrated HCl was then mixed thoroughly with the gelatin and water and the mixture was steam heated for ten minutes. At the end of this period the gelatin lost its viscosity and turned light pink in color. At this point 500 ml. of 95% ethanol and 750 ml. of acetone were added to precipitate the gelatin. The supernatant was poured off and the precipitated hydrolyzed gelatin rinsed with 200 ml. of acetone. 50 gm. of reduced iron and 200 ml. of distilled water were added to the partially hydrolyzed gelatin and the mixture was placed on a steambath and stirred constantly. During this heating process distilled water was intermittently added as well as reduced iron in two more portions of 50 gm. each. The steam heating and stirring continued until the solution took on a dark reddish brown appearance, in approximately 20 hours. The assay of the final product was 12.5% iron per dry weight of complex.

While the invention has been described in connection with different embodiments thereof, it will be understood that it is capable of further modification, and this application is intended to cover any variations, uses or adaptations of the invention following, in general, the principles of the invention and including such departures from the present disclosure as come within the known or customary practice in the art to which the invention pertains, and as may be applied to the essential features hereinbefore set forth and as fall within the scope of the invention or the limits of the appending claims:

Having thus described my invention, what I claim is:

1. The process of preparing a colloidal gelatin-iron complex which comprises partially hydrolyzing gelatin by heating gelatin in an acidic solution, separating the partially hydrolyzed gelatin from the acidic solution, and combining, in contact with water, said partially hydrolyzed gelatin with finely divided iron.

2. The process of preparing a colloidal gelatin iron complex which comprises partially hydrolyzing gelatin by heating gelatin in an acidic solution until it markedly loses viscosity, changing from a very viscous to a quite fluid state, precipitating the partially hydrolyzed gelatin from the solution by addition of a water miscible solvent, separating the partially hydrolyzed gelatin precipitate from the solution, dissolving the precipitate in water, intermittently adding reduced iron to the partially hydrolyzed gelatin solution while heating said partially hydrolyzed gelatin solution in a steam bath until said partially hydrolyzed gelatin solution takes on a dark reddish brown appearance and further addition of reduced iron does not perceptively effect the color of the solution.

3. The process of preparing a colloidal PVP iron complex which comprises partially hydrolyzing PVP by heating PVP in an acidic solution until it markedly loses viscosity, changing from a very viscous to a quite fluid state, precipitating the partially hydrolyzed PVP from the solution by addition of a water miscible solvent, separating the partially hydrolyzed PVP precipitate from the solution, dissolving the precipitate in water, intermittently adding reduced iron to the partially hydrolyzed PVP solution while heating said partially hydrolyzed PVP solution in a stream bath until the resultant solution takes on a dark reddish brown appearance and further addition of reduced iron does not perceptively effect the color of the solution.

4. The process of preparing a colloidal gelatin iron complex which comprises combining, in contact with water, gelatin with finely divided iron by heating and agitating in an autoclave at at least twenty pounds per square inch of pressure for at least 30 minutes.

5. The process of preparing a colloidal PVP iron complex which comprises combining, in contact with water, PVP with finely divided iron by heating and agitating in an autoclave at at least twenty pounds per square inch of pressure for at least 30 minutes.

6. The process of preparing a colloidal gelatin iron complex which comprises heating a water solution of gelatin in an autoclave at at least 20 pounds per square inch of pressure for at least 30 minutes, adding finally divided iron to the autoclaved solution and gently heating said solution.

7. The process of preparing a colloidal PVP iron complex comprises heating a water solution of PVP in an autoclave at at least 20 pounds per square inch of pressure for at least 30 minutes, adding finally divided iron to the autoclaved solution and gently heating said solution.

8. A composition comprising a complex of elemental iron with gelatin.

9. A composition comprising a complex of polyvinylpyrrolidone with elemental iron.

10. The process of preparing a colloidal gelatin-iron complex which comprises combining in contact with water, gelatin with finely-divided iron at a temperature between 60° centigrade and 127° centigrade and wherein the finely-divided iron is combined with the gelatin by intermittent addition of proportional amount of the total iron added.

11. The process of claim 10 which is carried out in alkaline solution.

12. A process as in claim 10 in which the finely-divided iron is prepared by reduction of an oxide of iron.

13. The process of claim 10 in which the resulting gelatin iron complex is purified by precipitation with a water-miscible solvent, the precipitate separated and redissolved in water.

14. The process of preparing a colloidal polyvinylpyrrolidone-iron complex which comprises combining, in contact with water, polyvinylpyrrolidone with finely-divided iron at a temperature between 60° centigrade and 127° centigrade and wherein the finely-divided iron is combined with the polyvinylpyrrolidone by intermittent addition of proportional amounts of the total iron added.

15. A process as in claim 14 which is carried out in an alkaline solution.

16. A process as in claim 14 in which the finely-divided iron is prepared by reduction of an oxide of iron.

17. The process of claim 14 in which the polyvinylpyrrolidone-iron complex is purified by precipitation with a water-miscible solvent, the precipitate is separated and redissolved in water.

18. The process of preparing a colloidal gelatin-elemental iron complex which comprises combining, in water, gelatin and finely divided elemental iron and heating the mixture thus formed for a time sufficient to complex said gelatin with said finely divided iron.

19. The process of preparing a colloidal gelatin-elemental iron complex which comprises combining, in water, partially hydrolyzed gelatin and finely divided elemental iron and heating the mixture thus formed for a time sufficient to complex said gelatin with said finely divided iron.

20. The process of preparing a colloidal polyvinylpyrrolidone-elemental iron complex which comprises combining, in water, polyvinylpyrrolidone and finely divided elemental iron and heating the mixture thus formed for a time sufficient to complex said polyvinylpyrrolidone with said finely divided iron.

References Cited in the file of this patent

UNITED STATES PATENTS

| | | |
|---|---|---|
| 1,824,018 | Horn | Sept. 22, 1931 |
| 2,745,785 | Bruce | May 15, 1956 |
| 2,749,274 | Buckwalter | June 5, 1956 |
| 2,897,120 | Cronin et al. | July 28, 1959 |
| 2,982,690 | Ratcliff | May 2, 1961 |

FOREIGN PATENTS

| | | |
|---|---|---|
| 759,577 | Great Britain | Oct. 17, 1956 |

OTHER REFERENCES

Drug Trade News, 30:2, p. 60 (Mfg. Sect.), January 17, 1955.

Chemical Abstracts, vol. 44, p. 8531e (1950).

"Plasdone," publ. by GAF, New York, 1951, 22 pp.; pp. 5–6 relied upon.

Lesser: Drug and Cosmetic Industry, 75:1, pp. 32, 33, 127, 129, and 130, July 1954.

U.S. Dispensatory 25, 1955, pp. 598–600.

Lloyd: "Roncovite," 51 pp.; pp. 6–11 relied upon (1954).